(12) United States Patent
Miller

(10) Patent No.: US 8,542,629 B2
(45) Date of Patent: Sep. 24, 2013

(54) INTERFERENCE MANAGEMENT IN A HUB-SPOKE SPOT BEAM SATELLITE COMMUNICATION SYSTEM

(71) Applicant: ViaSat, Inc., Carlsbad, CA (US)

(72) Inventor: Mark J. Miller, San Marcos, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 13/708,755

(22) Filed: Dec. 7, 2012

(65) Prior Publication Data

US 2013/0148571 A1 Jun. 13, 2013

Related U.S. Application Data

(60) Provisional application No. 61/568,569, filed on Dec. 8, 2011, provisional application No. 61/568,578, filed on Dec. 8, 2011, provisional application No. 61/591,810, filed on Jan. 27, 2012, provisional application No. 61/667,688, filed on Jul. 3, 2012.

(51) Int. Cl.
*H04J 3/08* (2006.01)

(52) U.S. Cl.
USPC ........................................ 370/326

(58) Field of Classification Search
USPC ........ 370/310, 315–326, 339–345; 455/3.02, 455/427–431
See application file for complete search history.

(56) References Cited

U.S. PATENT DOCUMENTS

| | | | |
|---|---|---|---|
| 4,188,578 A * | 2/1980 | Reudink et al. ............... | 370/323 |
| 5,991,279 A | 11/1999 | Haugli et al. | |
| 6,377,561 B1 | 4/2002 | Black | |
| 6,522,643 B1 | 2/2003 | Jacomb-Hood et al. | |
| 6,625,129 B1 | 9/2003 | Olds | |
| 6,801,565 B1 | 10/2004 | Bottomley et al. | |

(Continued)

FOREIGN PATENT DOCUMENTS

| EP | 1168670 A2 | 1/2002 |
|---|---|---|
| EP | 1328076 A2 | 7/2003 |

(Continued)

OTHER PUBLICATIONS

Lowry et al. Advanced Communications Technology Satellite. System Handbook, NASA TM-101490, revisions Sep. 30, 1993, 126 pages.

(Continued)

*Primary Examiner* — Frank Duong
(74) *Attorney, Agent, or Firm* — Kilpatrick Townsend & Stockton LLP

(57) ABSTRACT

Conducting communications via a satellite includes using an antenna subsystem to provide fixed location spot beams. The spot beams may be assigned to beam groups according to an objective. At least one transmit-side switch may be sequentially switched to connect an output of a first pathway with different spot beams within a first beam group to establish traffic according to a first transmit beam switching pattern. At least one transmit-side switch may be sequentially switched to connect an output of the second pathway with different spot beams within a second beam group to establish traffic according to a second transmit beam switching pattern. The first and second transmit beam switching patterns may be coordinated to avoid substantial interference between traffic transmitted to a spot beam of the first beam group on a same frequency as traffic transmitted to a spot beam of the second beam group.

28 Claims, 8 Drawing Sheets

(56) References Cited

U.S. PATENT DOCUMENTS

| | | | |
|---|---|---|---|
| 6,898,428 B2 | 5/2005 | Thorburn et al. | |
| 6,957,078 B1 | 10/2005 | Yousefi et al. | |
| 6,973,287 B2* | 12/2005 | Franzen et al. | 455/12.1 |
| 6,992,992 B1 | 1/2006 | Cooper | |
| 8,144,643 B2 | 3/2012 | Miller et al. | |
| 8,218,476 B2 | 7/2012 | Miller et al. | |
| 8,340,015 B1 | 12/2012 | Miller | |
| 8,340,016 B1* | 12/2012 | Miller et al. | 370/326 |
| 2002/0159403 A1 | 10/2002 | Reddy | |
| 2004/0166801 A1* | 8/2004 | Sharon et al. | 455/12.1 |
| 2005/0197060 A1 | 9/2005 | Hedinger et al. | |
| 2006/0126552 A1 | 6/2006 | Lee | |
| 2007/0135051 A1 | 6/2007 | Zheng et al. | |
| 2008/0146145 A1 | 6/2008 | Pateros et al. | |
| 2009/0023384 A1 | 1/2009 | Miller | |

FOREIGN PATENT DOCUMENTS

| | | |
|---|---|---|
| WO | 98/32245 | 7/1998 |
| WO | 02/11302 A2 | 2/2002 |
| WO | 2011/139991 A1 | 11/2011 |

OTHER PUBLICATIONS

Gedney et al. ACTS Technology Description and Results, National Aeronautics and Space Administration, Prepared under Contract NAS3-23790, Glen Research Center, Feb. 2000, 158 pages.

Gedney et al. Advanced Communications Technology Satellite (ACTS), NASA Lewis Research Center, 1989, 12 pages.

Berk et al. On-Board Processing for Future Satellite Communications Systems: Comparison of FDM, TDM, and Hybrid Accessing Schemes, MTR 8701 MITRE Bedford MA, Jun. 1982, 192 pages.

Signatron, Inc. 30/20 GHz FSS Feasibility Study Final Report JPL Contract No. 957641, Feb. 12, 1987, 296 pages.

Krawczyk, R. The Advanced Communications Technology Satellite—Performance, Reliability and Lessons Learned, ACTS Conference 2000 Proceedings, pp. 175-184.

Advanced Communications Technology Satellite (ACTS) Technology System Overview, retrieved on Jul. 27, 2012 at http://acts.grc.nasa.gov/technology/index.shtml, 2 pages.

Advanced Communications Technology Satellite (ACTS), Technology Spacecraft, retrieved on Jul. 27, 2012 at https://acts.grc.nasa.gov/technology/spacecraft/index.shtml, 2 pages.

Advanced Communications Technology Satellite (ACTS), Technology Spacecraft Specifications, retrieved on Jul. 27, 2012 at https://acts.grc.nasa.gov/technology/spacecraft/specs.shtml, 6 pages.

Advanced Communications Technology Satellite (ACTS), Technology Spacecraft, Multiple Hopping Beam Antennas, retrieved on Jul. 27, 2012 at https://acts.grc.nasa.gov/technology/spacecraft/multihop.shtml, 2 pages.

Advanced Communications Technology Satellite (ACTS), Technology Spacecraft, On-Board Baseband Processing (BBP) and Switching, retrieved on Jul. 27, 2012 at https://acts.grc.nasa.gov/technology/spacecraft/bbp.shtml, 2 pages.

Advanced Communications Technology Satellite (ACTS), Technology Spacecraft, Microwave Switch Matrix (MSM), retrieved on Jul. 27, 2012 at https://acts.grc.nasa.gov/technology/spacecraft/msm.shtml, 1 page.

Advanced Communications Technology Satellite (ACTS), Technology Spacecraft, Adaptive Rain Fade Compensation, retrieved on Jul. 27, 2012 at https://acts.grc.nasa.gov/technology/spacecraft/rainfade.shtml, 2 pages.

Advanced Communications Technology Satellite (ACTS), Technology Earth Stations, retrieved on Jul. 27, 2012 at https://acts.grc.nasa.gov/technology/earthstations/index.shtml, 2 pages.

Ogawa et al. Wideband InterNetworking Engineering Test and Demonstration Satellite (WINDS), National Institute of Information and Communications Technology, vol. 54 No. 4 Sections 1-7, 2007, retrieved on Jul. 27, 2012 at http://www.eoportal.org/directory/pres_WINDSWidebandInterNetworkingengineeringtestandDemonstrationSatellite.html, 120 pages.

WINDS (Wideband InterNetworking engineering test and Demonstration Satellite), retrieved on Jul. 27, 2012 at http://www.eoportal.org/directory/pres_WINDSWidebandInterNetworkingengineeringtestandDemonstrationSatellite.html, 14 pages.

Arnold et al., Mobile Communications in A Geosynchronous Regenerative Satellite Mesh (RSM) System, pp. 1-6, Hughes Network Systems, Germantown, Maryland, 2006.

Beam Forming Networks, Application Note, pp. 1-36. EMS Technologies, Inc. Aug. 2004, Revision B.

Couchman, A. et al. Defocused Array Fed Reflector Antennas for Ka, Broad Band Satellites, pp. 1-8, 2005.

Franchi et al., Technology Trends and Maket Drivers for Broadband Mobile Via Satellite: Inmarsat Bgan, pp. 1-9, London, United Kingdom, 2001.

Gopal et al., Regenerative Satellite Mesh System for Realtime Multi-Party Multimedia Traffic Hughes Network Systems, LLC (HUGHES) Germantown, MD, 2009.

Gopal et al., Technology Readiness of Future Generation Networks Leveraging Regenerative Satellite Mesh Architecture—A Spaceway Perspective, pp. 1-7, Hughes Network Systems, LLC, Germantown, MD, 2006.

Gopal, R. Innovations in Satellite Networking Technology and Products, pp. 1-10. HUGHES, SIA, Dec. 7, 2006.

Hadinger et al., Next Generation High Capacity Ka-Band Satellite Systems, pp. 1-8, Northrop Grumman Space Technology, Redondo Beach, CA., 2007.

Kitao et al., Proto-Flight Model Development of the Multi-beam Active Phased Array Antenna for WINDS, pp. 1-4, 2007.

"Kizuna" (WINDS) (Wideband InterNetworking engineering test and Demonstration Satellite) (Launched by H-IIA F14), WINDS Project Team, Office of Space Applications Japan Aerospace Exploration Agency, 17 pages. 2008.

Mallison et al., Enabling Technologies for the Eurostar Geomobile Satellite, p. 1-10. 19th AIAA International Communications Satellite Systems Conference. ICSSC, 2001.

Nelson, J. Top Satellite Technology At Forefront. Boeing Frontiers, 1(3). (2002). 5 pages.

Reudink, D.O. et al., A Scanning Spot-Beam Satellite System, Bell System Technical Journal, vol. 56, Oct. 1977, p. 1549-1560.

Rooney, K. J. Evolving Satellite Markets and their Enabling Technologies, pp. 1-18, Boeing Satellite Systems, Los Angeles, CA, Oct. 2002.

Roper et al., WGS phased arrays support next generation DoD SATCOM capability. IEEE International Symposium on Phased Array Systems and Technology, 2003, pp. 82-87 (2003).

Rustako, A. J. Jr. et al., An Experimental Scanning Spot Beam Satellite System Implementing 600 Mbit/Sec Tdma, IN: International Conference on Digital Satellite Communications, 6th, Phoenix, AZ, Sep. 19-23, 1983, Proceedings (A85-15451 04-32). New York, Institute of Electrical and Electronics Engineers, 1983, p. XI-18 to XI-23.

Satellite Provision of Next Generation Broadband Services in UK, Prepared for the Broadband Stakeholder Group, pp. 1-27, Oct. 29, 2007. Information Technology Telecommunications and Electronics Association, London.

Science Applications International Corporation. Satellite Communications Technology Database. NASA CR-2001-210563-PART2, Mar. 2001, 71 pages.

Stone, J. Spaceway 3 Takes Flight pp. 1-4. Near Earth LLC (Aug. 2007).

Sunderland et al., Megagate ASICs for the Thuraya Satellite Digital Signal Processor, pp. 1-8, Proceedings of the International Symposium on Quality Electronic Design, 2002 IEEE Computer Society (2002).

Torlak et al. Fast Estimation of Weight Vectors to Optimize Multi-Transmitter Broadcast Channel Capacity. IEEE Transactions on Single Processing, vol. 46, No. 1 Jan. 1998, 4 pages.

Whitefield et al., Spaceway Now and in the Future: On-Board IP Packet Switching Satellte Communication Network, pp. 1-7, Hughes Network Systems, LLC, Germantown, MD, 2006.

International Search Report corresponding to PCT Application No. PCT/US2010/026934, dated May 11, 2010, 12 pages.

International Search Report corresponding to PCT Application No. PCT/US2011/34845, dated Aug. 26, 2011, 13 pages.
International Search Report and Written Opinion for PCT Application No. PCT/US2012/048668, mailed on Oct. 19, 2012, 10 pages.
U.S. Appl. No. 13/560,788, filed Jul. 27, 2012.
U.S. Appl. No. 13/708,493, filed Dec. 7, 2012.
International Search Report and Written Opinion for PCT Application No. PCT/US2012/068471, mailed on Apr. 12, 2013, 9 pages.

* cited by examiner

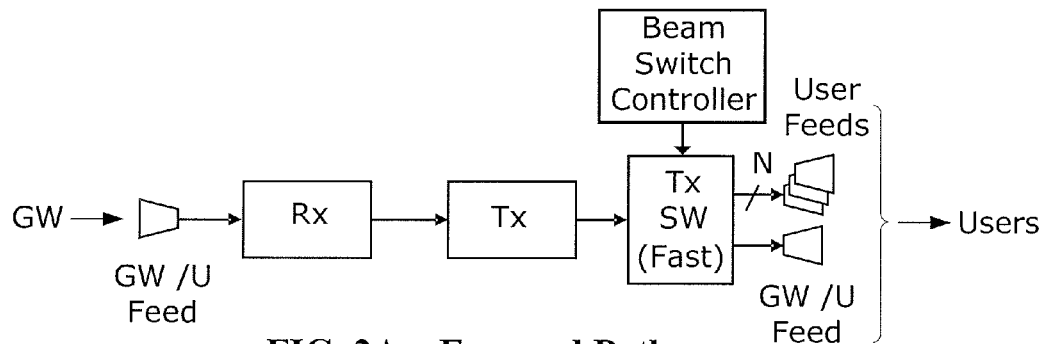
FIG. 2A – Forward Pathway
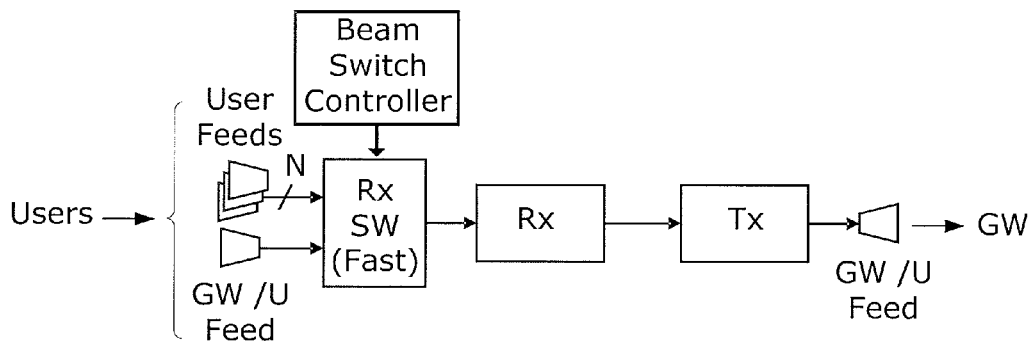
FIG. 2B – Return Pathway
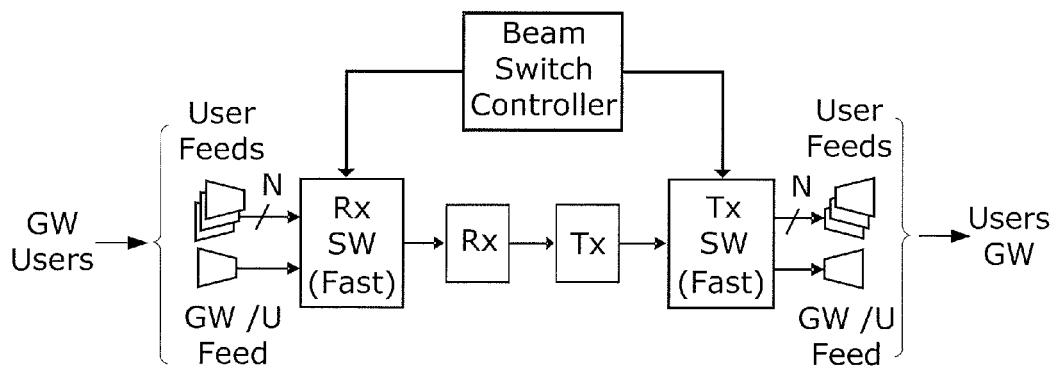
FIG. 2C – Forward / Return Pathway

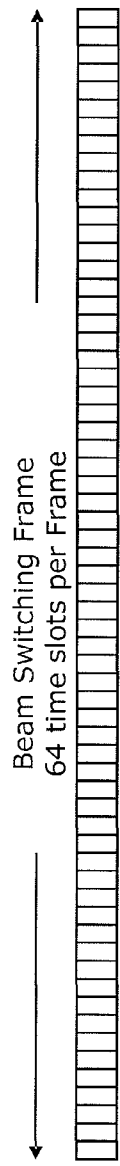
FIG. 4A
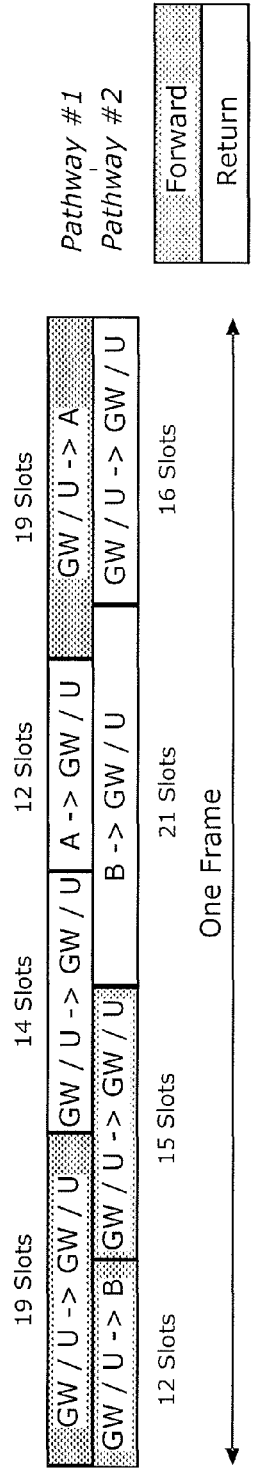
FIG. 4B – Example Frame 1
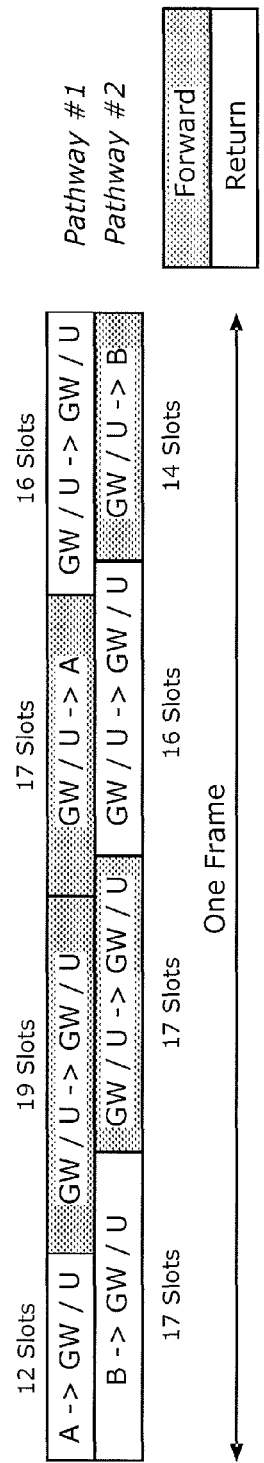
FIG. 4C – Example Frame 2

INTERFERENCE MANAGEMENT IN A HUB-SPOKE SPOT BEAM SATELLITE COMMUNICATION SYSTEM

CROSS-REFERENCES TO RELATED APPLICATIONS

The present application claims priority to U.S. Provisional Application Nos. 61/568,569, filed Dec. 8, 2011; 61/568,578, filed Dec. 8, 2011; 61/591, 810, filed Jan. 27, 2012; and 61/667,688, filed Jul. 3, 2012; the disclosures of which are incorporated herein by reference in their entirety for all purposes.

Disclosures of the following U.S. nonprovisional applications are incorporated herein by reference in their entirety for all purposes:

U.S. Nonprovisional application Ser. No. 13/560,788, filed Jul. 27, 2012;
U.S. Nonprovisional application Ser. No. 13/560,825, filed Jul. 27, 2012; and
U.S. Nonprovisional Application No. 13/708,493, filed concurrently with the present application.

FIELD OF THE INVENTION

The present invention relates generally to satellite communication systems and, more particularly, to providing interference management in a hub-spoke satellite communication system.

BACKGROUND

A satellite communication system can include a satellite that links gateway terminals with user terminals. The gateway terminals can provide an interface with a network such as the Internet or a public switched telephone network. Each gateway terminal typically services a number of user terminals located in one or more spot beams. Improved system capacity can be obtained by reusing the same frequencies in different spot beams. However, to reuse the same frequencies requires that spot beams be sufficiently separated to avoid interference. This can place limitations on the overall system capacity that can be achieved.

SUMMARY

Embodiments of the present invention provide improved interference management in hub-spoke satellite communication systems by coordinating beam switching patterns between beam groups.

BRIEF DESCRIPTION OF THE DRAWINGS

In some of the drawings a sub-label is associated with a reference numeral and follows a hyphen to denote one of multiple similar components. When reference is made to a reference numeral without specifying an existing sub-label, it is intended to refer to all such similar components.

FIGS. 2A-2C are simplified block diagrams of various examples of a pathway of a satellite in accordance with some embodiments of the present invention;

FIGS. 4A-4C are simplified diagrams providing examples of flexible allocation of capacity in accordance with some embodiments of the present invention;

DETAILED DESCRIPTION

Figure 1:
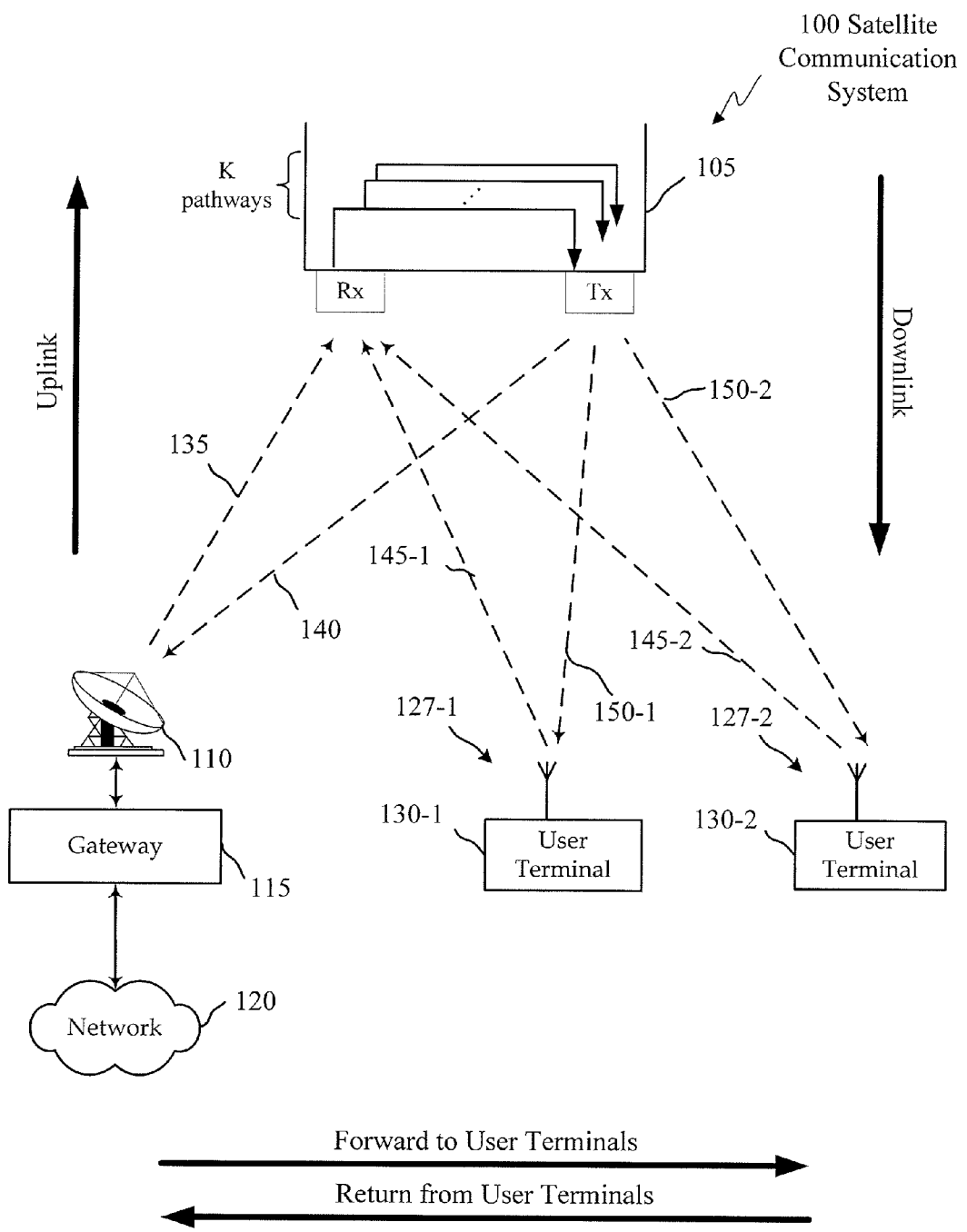
FIG. 1 is a simplified diagram of a hub-spoke satellite communication system in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, and are to be considered within the scope of the invention.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The term "coupled" as used herein does not require that the components be directly connected to each other. Instead, the term is intended to also include configurations with indirect connections where one or more other components may be included between coupled components. For example, such other components may include amplifiers, attenuators, isolators, directional couplers, redundancy switches, and the like.

FIG. 1 is a simplified diagram of a hub-spoke satellite communication system 100 in accordance with an embodiment of the present invention. The satellite communication system 100 may include a satellite 105 linking a gateway terminal 115 with one or more user terminals 130. The satellite communication system 100 includes space and ground segments. The space segment may include one or more satellites while the ground segment may include a number of user terminals, gateway terminals, network operations centers (NOCs), satellite and gateway terminal command centers, and the like. Not all elements are shown in the figure for clarity.

The gateway terminal 115 is sometimes referred to as a hub or ground station. The gateway terminal 115 may provide communication links 135, 140 between the gateway terminal 115 and the satellite 105. The gateway terminal 115 may also schedule traffic to the user terminals 130. Alternatively, the scheduling may be performed in other parts of the satellite communication system 100 (e.g., at one or more NOCs and/or gateway command centers—neither of which are shown in this embodiment). Scheduling information may be communicated among the NOC(s), gateway command center(s), satellite(s), and user terminals through a terrestrial network, a satellite command link, the communications system, etc. using conventional techniques and thus will not be described further.

The gateway terminal 115 may also provide an interface between a network 120 and the satellite 105. The gateway terminal 115 may receive data and information from the network 120 that is directed the user terminals 130. The gateway terminal 115 may format the data and information for delivery to the user terminals 130 via the satellite 105. The gateway terminal 115 may also receive signals carrying data and information from the satellite 105. This data and information may be from the user terminals 130 and directed to destinations accessible via the network 120. The gateway terminal 115 may format this data and information for delivery via the network 120.

The network 120 may be any suitable type of network, for example, the Internet, an IP network, an intranet, a wide-area network (WAN), a local-area network (LAN), a virtual private network (VPN), a public switched telephone network (PSTN), a public land mobile network, and the like. The network 120 may include various types of connections include wired, wireless, optical or other types of links. The network 120 may also connect the gateway terminal 115 with other gateway terminals that may be in communication with the satellite 105 or with other satellites.

The gateway terminal 115 may use one or more antennas 110 to transmit forward uplink signals 135 to the satellite 105 and to receive return downlink signals 140 from the satellite 105. The antenna 110 shown in FIG. 1 includes a reflector with high directivity in the direction of the satellite 105 and low directivity in other directions. The antenna 110 may be implemented in a variety of configurations and may include features such as high isolation between orthogonal polarizations, high efficiency in the operational frequency bands, low noise, and the like.

In some satellite communication systems there may be a limited frequency spectrum available for transmission. Communication links 135, 140 between the gateway terminal 115 and the satellite 105 may use the same, overlapping, or different frequencies as compared to the communication links 145, 150 between the satellite 105 and the user terminals 130. In some embodiments, the gateway terminal 115 may be located away from the user terminals 130, which facilitates frequency re-use. In other embodiments, the user terminals 130 may be located near the gateway terminal 115.

The satellite 105 may be a geostationary satellite that is configured to receive and transmit signals. The satellite 105 may receive the forward uplink signals 135 from the gateway terminal 115 and transmit corresponding forward downlink signals 150 to the user terminals 130. The satellite 105 may also receive return uplink signals 145 from the user terminals 130 and transmit corresponding return downlink signals 140 to the gateway terminal 115.

The satellite 105 may include one or more fixed directional antennas for reception and transmission of the signals 135, 140, 145, 150. For example, a directional antenna may include a fixed reflector with one or more feed horns for each spot beam. The feed horns may be employed for receiving uplink signals 135, 145 and transmitting downlink signals 140, 150.

Contours of a spot beam may be determined in part by the particular antenna design and depend on factors such as location of feed horn relative to a reflector, size of the reflector, type of feed horn, etc. Each spot beam's contour on the earth may generally have a conical shape (e.g., circular or elliptical), illuminating a spot beam coverage area for both transmit and receive operations. A spot beam may illuminate terminals that are on or above the earth surface (e.g., airborne user terminals, etc.). In some embodiments, directional antennas may be used to form fixed location spot beams (or spot beams that are associated with substantially the same spot beam coverage area over time).

The satellite 105 may operate in a multiple spot-beam mode, receiving and transmitting a number of signals in different spot beams. Each individual spot beam can serve a gateway, a number of user terminals, or both a gateway and a number of user terminals. In other words, the gateway 115 and the user terminals 130 of FIG. 1 may be within the coverage area of the same or different spot beams. Each spot beam may use a single carrier (i.e., one carrier frequency), a contiguous frequency range (i.e., one or more carrier frequencies), or a number of frequency ranges (with one or more carrier frequencies in each frequency range).

The satellite 105 may include a number of non-regenerative pathways (represented as K pathways in this embodiment). Each of the K pathways may function as a forward pathway or a return pathway at any given instant in time. For example, in some embodiments, one or more first pathways may be dedicated as forward pathways and one or more second pathways (different from the first pathways) may be dedicated as return pathways. In some embodiments, one or more pathways may be used for both forward and return at different times using a frame structure as described further herein. In some embodiments, a satellite may include fully switchable pathways used for forward and return, partially switchable pathways used for forward, partially switchable pathways used for return, dedicated (non-switching) pathways, and any combinations thereof. The uplink signals 135, 145 received by the satellite 105 may be directed along one or more of the pathways before being transmitted as downlink signals 140, 150.

The signals passing through a pathway need not be demodulated and re-modulated as in a regenerative or processing satellite architecture. Instead, signal manipulation by a non-regenerative satellite may provide functions such as frequency translation, polarization conversion, filtering, amplification, and the like, while omitting data demodulation/modulation and error correction decoding/encoding.

The forward downlink signals 150 may be transmitted from the satellite 105 to one or more of the user terminals 130. The user terminals 130 may receive the forward downlink signals 150 using antennas 127. In one embodiment, an antenna and a user terminal together comprise a very small aperture terminal (VSAT) with the antenna measuring about 0.75 meters in diameter and having about 2 watts of transmit power. In other embodiments, a variety of other types of antennas 127 may be used to receive the forward downlink signals 150 from the satellite 105. Each of the user terminals 130 may be connected to various consumer premises equipment (CPE) such as computers, local area networks (e.g., including a hub or router), Internet appliances, wireless networks, and the like.

The user terminals 130 may transmit data and information to a destination accessible via the network 120 (e.g., the Internet). The user terminals 130 may transmit the return uplink signals 145 to the satellite 105 using the antennas 127. The user terminals 130 may transmit the signals according to a variety of formats, including for example, formats defined by standards such as DVB (e.g. DVB-S, DVB-S2, DVB-RCS), WiMAX, LTE, DOCSIS, and similar standards in their native or adapted (modified) forms. In various embodiments, the physical layer techniques for each of the links 135, 140, 145, 150 may be the same as each other or may be different from each other.

FIGS. 2A-2C are simplified block diagrams of pathways that can be used in the satellite of FIG. 1. In general, the pathways may provide for conversion of uplink signals received by the satellite into downlink signals. Each of the pathways may include a receiver (Rx) and a transmitter (Tx). The receiver may include an LNA, and the transmitter may include an HPA (e.g., a traveling wave tube amplifier (TWTA)). The receiver and transmitter are not limited to these components, however, and may include other components as well, including for example, components that provide frequency conversion (e.g., a down converter), filtering, and the like. The specific components included in each pathway and the configuration of those components may vary depending on the particular application.

The satellite communication system may use a framed hub-spoke beam-switched pathway access protocol, with time slots like a Satellite Switched Time-Division Multiple Access (SS/TDMA) scheme. However, each time slot of the frame may correspond to either forward link (gateway to user terminals) or return link (user terminals to gateway) traffic from a transmitting beam to a receiving beam. During normal operation, continuous streams of frames are typically used to facilitate communications. Multiple terminals may be serviced during each time slot using well known multiplexing and multiple access techniques (e.g., Time-Division Multiplexing (TDM), Time-Division Multiple Access (TDMA), Frequency-Division Multiple Access (FDMA), Multi-Frequency Time-Division Multiple Access (MF-TDMA), Code-Division Multiple Access (CDMA), and the like). For example, a forward link time slot may be divided into multiple sub slots wherein transmissions to different terminals or groups of terminals are made in each sub slot. Similarly, a return link time slot may be divided into multiple sub slots. Some slots or sub slots may be reserved for network control or signaling information (e.g., communication of scheduling information).

Forward Pathways

FIG. 2A provides an example of a forward pathway in accordance with an embodiment providing a partial switching capability. In this embodiment, a receiver may be configured to receive forward uplink signals from a gateway via a gateway beam feed (GW/U Feed; in general GW feeds are labeled GW/U as they may, in some embodiments, also cover user terminals). In forward operation, the gateway beam feed may receive signals from one or more gateway terminals (e.g., gateway terminal 115 of FIG. 1). The output of the receiver may be coupled to the input of a transmitter.

The transmitter may be coupled to a transmit switch (Tx SW). For example, the transmit switch may be positioned after the transmitter of the pathway along a signal path. The transmit switch may be used to control an output from the pathway. For example, the transmit switch may dynamically switch the transmission signal between any one of N user beam feeds (User Feeds) or a gateway beam feed (GW/U Feed). Each of the N user beam feeds may provide signals to one or more user terminals (e.g., user terminals 130 of FIG. 1). The gateway beam feed may provide signals to user terminals that are located within the same spot beam coverage area as the gateway terminal (hence the designation "GW/U"). The set of beams that share a common transmit switch is referred to as a transmit beam group. Although only a single gateway is shown, in some embodiments, more than one gateway may be used.

The transmit switch may cycle between different switch positions according to a beam group transmit switching pattern to provide forward link capacity to output beams associated with each of the output beams feeds. The beam group transmit switching pattern may be a set of switch positions versus time during a frame that defines which feed the transmit switch connects to the transmitter.

The beam group transmit switching pattern may be stored in memory at a beam switch controller. The beam group transmit switching pattern may be uploaded to the beam switch controller using an uplink signal that may be in-band (e.g., using particular time slots or carriers within the communications system) or out-of-band (e.g., using a separate command control and telemetry link to the satellite). The fraction of time the transmit switch spends in each position may determine the forward link capacity provided to each beam. Flexible allocation of forward link capacity is accomplished by altering the amount of time the transmit switch spends at each position. In other words, forward link capacity is flexibly allocated by changing the relative duty cycle by which the pathway serves the beams. The time allocation may be dynamic (e.g., varying with the hour of the day) to accommodate temporal variations of a load in each beam.

The transmit switch may be a fast switch (capable of switching rapidly, e.g., relative to a frame described further below). The switch may operate at radio frequency (RF) such as Ka band frequencies. In some embodiments, a ferrite switch may be used for the transmit switch. Ferrite switches may provide fast switching, low insertion loss (e.g., do not substantially impact equivalent isotropically radiated power (EIRP) or gain-to-noise-temperature (G/T)), and high power handling capabilities.

Return Pathways

FIG. 2B provides an example of a return pathway in accordance with an embodiment providing a partial switching capability. In this embodiment, a receive switch may select between any one of N user beam feeds (User Feeds) or a gateway beam feed (GW/U Feed). Each of the N user beam feeds may include return signals from one or more user terminals (e.g., user terminals 130 of FIG. 1). The gateway beam feed may include return signals from user terminals that are located within the same spot beam coverage area as the gateway terminal (hence the designation "GW/U"). The receive switch (Rx SW) output may be coupled to the pathway receiver. For example, the receive switch may be before the receiver of the pathway along a signal path. The set of beams that share a common receive switch is referred to as a receive beam group.

Some embodiments may include one or more LNAs before the receive switch. For example, each input beam feed may have an associated LNA with the receive switch positioned after the LNA. Alternatively, a summer may be used to combine outputs from the LNAs, and the LNAs may be switched on and off to implement the switching function of the receive switch.

The pathway of FIG. 2B may also include a transmitter configured to provide return downlink signals to a gateway beam feed (GW/U Feed). In the return operation, the gateway beam feed may include signals to one or more gateway terminals (e.g., gateway terminal 115 of FIG. 1).

The receive switch may cycle between different switch positions according to a beam group receive switching pattern to provide return link capacity to input beams associated with each of the input beams feeds. The operation and control (using a beam switch controller) of the receive switch may be similar to that of the transmit switch discussed above (i.e., a beam group receive switching pattern may be communicated to the satellite and used to provide a time varying and flexible allocation of capacity on the return links to different beams in an analogous manner to the forward link operation described above).

Forward/Return Pathways

FIG. 2C provides an example of a forward/return pathway in accordance with an embodiment providing a full switching capability. In this embodiment, a receiver may be coupled to a receive switch (Rx SW), and a transmitter may be coupled to a transmit switch (Tx SW). The receive switch may be used to control the input to the pathway, and the transmit switch may be used to control the output from the pathway. The set of beams that share transmit and receive switches is referred to as a beam group.

Figure 3:
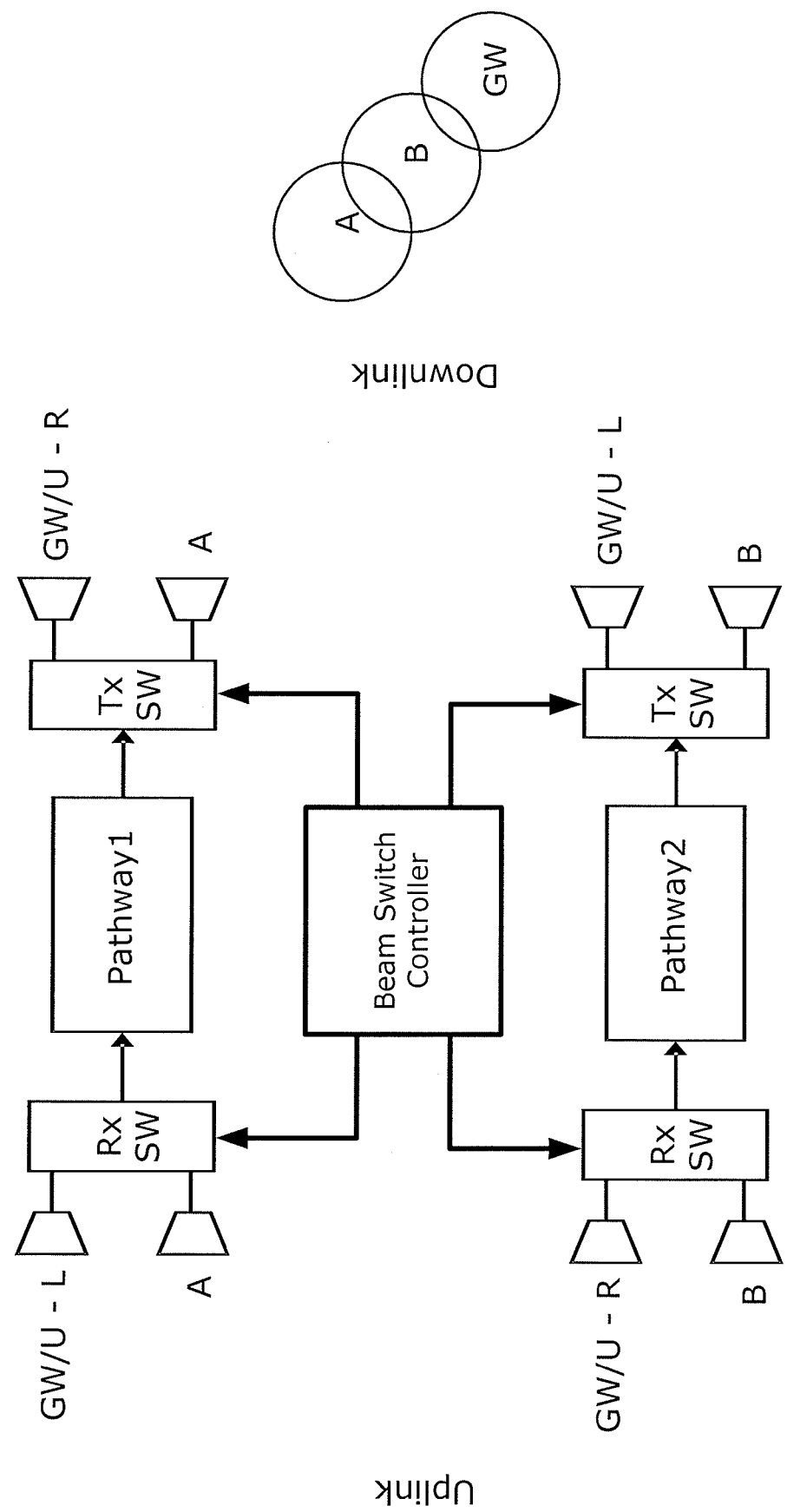
FIG. 3 is a simplified block diagram of a gateway (GW) switch group of a satellite in accordance with an embodiment of the present invention.

FIG. 3 is a simplified block diagram of two forward/return pathways each coupled to a receive-side switch and a transmit-side switch to provide beam switching in accordance with an embodiment of the present invention. These pathways may correspond to two of the K pathways of the satellite shown in FIG. 1. Although not explicitly shown, each of the forward/return pathways may include one or more of the same components as the forward pathway and the return pathway shown in FIGS. 2A and 2B, respectively. Thus, each forward/return pathway may include a receiver coupled to a receive switch (Rx SW), as well as a transmitter coupled to a transmit switch (Tx SW). The set of beams that share transmit and receive switches may be referred to as a beam group.

A beam switch controller (BSC) may control the Rx switches according to a receive beam switching pattern and $T_x$ switches according to a transmit beam switching pattern, together referred to as a beam group switching pattern. According to an embodiment of the invention, the beam group switching pattern of a pathway may be arranged such that a portion of a frame (up to and including the entire frame) is dedicated to forward link operation, while another portion of the same frame (up to and including the entire frame) is dedicated to return link operation. Coordinating one beam group's switching pattern and a second beam group's switching pattern over a portion of a frame can be used, for example, to avoid substantial interference between beams that would interfere with each other if transmitted at the same time on the same frequency.

In some embodiments, the beam group switching patterns may be the same from frame-to-frame (repeated in each of a plurality of consecutive frames), while in other embodiments, the beam group switching patterns may be changed from frame-to-frame. In yet other embodiments, a particular beam group switching pattern may be used for a particular time duration while another beam group switching pattern may be used for a different time duration (e.g., different times of the day, different days of the week, or the like). Many variations, modifications, and alternatives of switching patterns may be used within the embodiments disclosed herein. Whether the beam group switching patterns remain the same or change may depend on a desired capacity allocation amongst beams and/or a desired ratio between forward and return capacity.

To the right side of FIG. 3 is a coverage map showing one example of beam coverage areas A, B and GW/U on the surface of the earth. In this embodiment, the first pathway (Pathway 1) is coupled to a receive-side switch and a transmit-side switch that are each associated with a user beam feed (A). The second pathway (Pathway 2) is coupled to a receive-side switch and a transmit-side switch that are each associated with a user beam feed (B). The switches may be fast switches as described previously. The user terminals associated with each of the user beam feeds A, B may be serviced by the same gateway terminal associated with a gateway beam feed (GW/U).

To reduce interference, the gateway beam feeds GW/U at each pathway may use orthogonal polarizations and the uplink frequencies may be different from the downlink frequencies. The uplink gateway beam feed GW/U to Pathway 1 may use a left-hand polarization (L), and the uplink gateway beam feed GW/U to Pathway 2 may use a right-hand polarization (R). In this embodiment, the pathways convert the polarization so that the downlink gateway beam feed GW/U from Pathway 1 uses a right-hand polarization R, and the downlink gateway beam feed GW/U from Pathway 2 uses a left-hand polarization L. Due to the different polarizations and frequencies, the spot beam associated with the gateway beam feed GW/U may include both forward and return signals simultaneously.

In some embodiments, there may be two groups of user terminals associated with the gateway beam feed GW/U. One group may transmit using a left-hand polarization L and receive using a right-hand polarization R. These user terminals may be serviced through Pathway 1. Another group may transmit using a right-hand polarization R and receive using a left-hand polarization L. These user terminals may be serviced through Pathway 2.

The receive-side switch and the transmit-side switch coupled to Pathway 1 may use switching patterns that are independent of those used by the receive-side switch and the transmit-side switch coupled to Pathway 2. This provides flexibility in allocating capacity between each of the beam feeds (A, B, GW/U) both temporally and spatially as well as between both forward and return traffic.

FIGS. 4A-4C are simplified diagrams providing examples of flexible allocation of capacity in accordance with some embodiments of the present invention. A satellite communication system may use a framed hub-spoke beam switched pathway access protocol, with time slots like a Satellite Switched Time-Division Multiple Access (SS/TDMA) scheme. Now, however, each time slot of the frame may correspond to either forward link (gateway to user terminals) or return link (user terminals to gateway) traffic from a transmitting beam to a receiving beam—not just a single transmission from one terminal to another.

During normal operation, continuous streams of frames are typically used to facilitate communications. In the embodiment presented in FIG. 4A, a single hub-spoke beam switched frame is shown that includes 64 time slots. FIGS. 4A-4C are presented merely as examples, and embodiments of the present invention are not limited to specific pathway access protocols or frame/slot configurations. Multiple terminals may be serviced during each time slot using multiplexing and multiple access techniques (e.g., Time-Division Multiplexing (TDM), Time-Division Multiple Access (TDMA), Frequency-Division Multiple Access (FDMA), Multi-Frequency Time-Division Multiple Access (MF-TDMA), Code-Division Multiple Access (CDMA), and the like).

FIGS. 4B-4C provide examples of flexible allocation of capacity during a frame. These figures provide visual representations of the flexible allocation of capacity that may be realized using the beam switching patterns described throughout this specification. These examples refer specifically to the pathways (Pathway 1, Pathway 2) and the beams (A, B, GW/U) shown in FIG. 3.

FIG. 4B shows signals passing through Pathway 1 and Pathway 2 during a frame (Frame 1). The first 19 slots of Frame 1 over Pathway 1 are occupied by signals that are received at the gateway beam feed GW/U and transmitted to the gateway beam feed GW/U. These are forward link signals from the gateway terminal associated with the gateway beam feed GW/U that are destined for at least one user terminal associated with the gateway beam feed GW/U. During these 19 slots, the receive-side switch is in an input switch position associated with the gateway beam feed GW/U, and the transmit-side switch is in an output switch position associated with the gateway beam feed GW/U.

The next 14 slots of Frame 1 over Pathway 1 are occupied by signals that are received from the gateway beam feed GW/U and transmitted to the gateway beam feed GW/U. These are return link signals from at least one user terminal associated with the gateway beam feed GW/U that are destined for the gateway terminal associated with the gateway beam feed GW/U. During these 14 slots, the receive-side switch is in the input switch position associated with the gateway beam feed GW/U, and the transmit-side switch is in the output switch position associated with the gateway beam feed GW/U.

The next 12 slots of Frame 1 over Pathway 1 are occupied by signals that are received from the user beam feed A and transmitted to the gateway beam feed GW/U. These are return link signals from at least one user terminal associated with the user beam feed A that are destined for the gateway terminal associated with the gateway beam feed GW/U. During these 12 slots, the receive-side switch is in an input switch position associated with the user beam feed A, and the transmit-side switch is in the output switch position associated with the gateway beam feed GW/U.

The final 19 slots of Frame 1 over Pathway 1 are occupied by signals that are received from the gateway beam feed GW/U and transmitted to the user beam feed A. These are forward link signals from the gateway terminal associated with the gateway beam feed GW/U that are destined for at least one user terminal associated with the user beam feed A. During these 19 slots, the receive-side switch is in the input switch position associated with the gateway beam feed GW/U, and the transmit-side switch is in and output switch position associated with the user beam feed A.

Without going into the same level of detail as with Pathway 1, the first 12 slots of Frame 1 over Pathway 2 are occupied by forward link signals that are received from the gateway beam feed GW/U and transmitted to the user beam feed B. The next 15 slots of Frame 1 over Pathway 2 are occupied by forward link signals that are received from the gateway beam feed GW/U and transmitted to the gateway beam feed GW/U. The next 21 slots of Frame 1 over Pathway 2 are occupied by return link signals that are received from the user beam feed B and transmitted to the gateway beam feed GW/U. The final 16 slots of Frame 1 over Pathway 2 are occupied by return link signals that are received from the gateway beam feed GW/U and transmitted to the gateway beam feed GW/U. For each of these configurations, the receive-side switch and the transmit-side switch associated with Pathway 2 are switched to the appropriate input and output switch positions based on receive beam switching patterns and transmit beam switching patterns.

FIG. 4C shows signals passing through Pathway 1 and Pathway 2 during a different frame (Frame 2). This frame may be adjacent to Frame 1 in time or there may be any number of frames between Frame 1 and Frame 2. The first 12 slots of Frame 2 over Pathway 1 are occupied by return link signals that are received from the user beam feed A and transmitted to the gateway beam feed GW/U. The next 19 slots of Frame 2 over Pathway 1 are occupied by forward link signals that are received from the gateway beam feed GW/U and transmitted to the gateway beam feed GW/U. The next 19 slots of Frame 2 over Pathway 1 are occupied by forward link signals that are received from the gateway beam feed GW/U and transmitted to the user beam feed A. The final 16 slots of Frame 2 over Pathway 1 are occupied by return link signals that are received from the gateway beam feed GW/U and transmitted to the gateway beam feed GW/U.

The first 17 slots of Frame 2 over Pathway 2 are occupied by return link signals that are received from the user beam feed B and transmitted to the gateway beam feed GW/U. The next 17 slots of Frame 2 over Pathway 2 are occupied by forward link signals that are received from the gateway beam feed GW/U and transmitted to the gateway beam feed GW/U. The next 16 slots of Frame 2 over Pathway 2 are occupied by return link signals that are received from the gateway beam feed GW/U and transmitted to the gateway beam feed GW/U. The final 14 slots of Frame 2 over Pathway 2 are occupied by forward link signals that are received from the gateway beam feed GW/U and transmitted to the user beam feed B.

Capacity

The capacity of a satellite may be estimated as:

$$C = \sum_{k=1}^{K} \alpha_k^f W_k \gamma_k^f + \sum_{k=1}^{K} (1 - \alpha_k^f) W_k \gamma_k^r \tag{1}$$

where K is the number of pathways on the satellite, $W_k$ is the amount of spectrum used in the $k^{th}$ pathway, $\alpha_k^f$ is the fraction of time pathway k is used in the forward link configuration, and $\gamma_k$ is the average transmission rate for the $k^{th}$ pathway (in BPS/Hz). The value for $\gamma_k$ may be determined from link budgets and can depend on factors such as beam sizes, satellite power amplifier sizes, gateway terminal and user terminal EIRP and G/T capability, as well as C/I calculations from co-channel interference (CCI—explained more fully below under Interference Management). The superscripts f and r on $\gamma_k$ indicate the forward and return directions respectively. For a pathway depicted in FIG. 2A, $\alpha_k^f=1$. For a pathway depicted in FIG. 2B, $\alpha_k^f=0$. For a pathway depicted in FIG. 3, $\alpha_k^f$ assumes a value between 0 and 1. For a specific configuration of all pathways being identical (using the same amount of spectrum and having the same allocation of time between forward and return operation) the capacity is $C=KW\gamma$, where $\gamma$ is the weighted average transmission rate of the pathway. Accordingly, the capacity is generally proportional to both the number of pathways and the spectrum allocated per beam. Using the full spectrum per pathway may result in the most capacity as long as the resulting CCI does not drive a signal-to-interference plus noise ratio (SINR) to be too low, thus driving down $\gamma$. CCI can be managed using techniques described further below.

For Ka band satellites, a value of K=80 pathways may be achieved using current satellite technology. As an example of capacity for such a satellite, by using narrow spot beams (≈0.1 degree beam radius), W=1500 MHz, and 75 cm user terminals, a transmission rate of more than 2 bps/Hz may be realized yielding a total satellite capacity of over 250 Gbps.

Coverage Area

Figure 5:
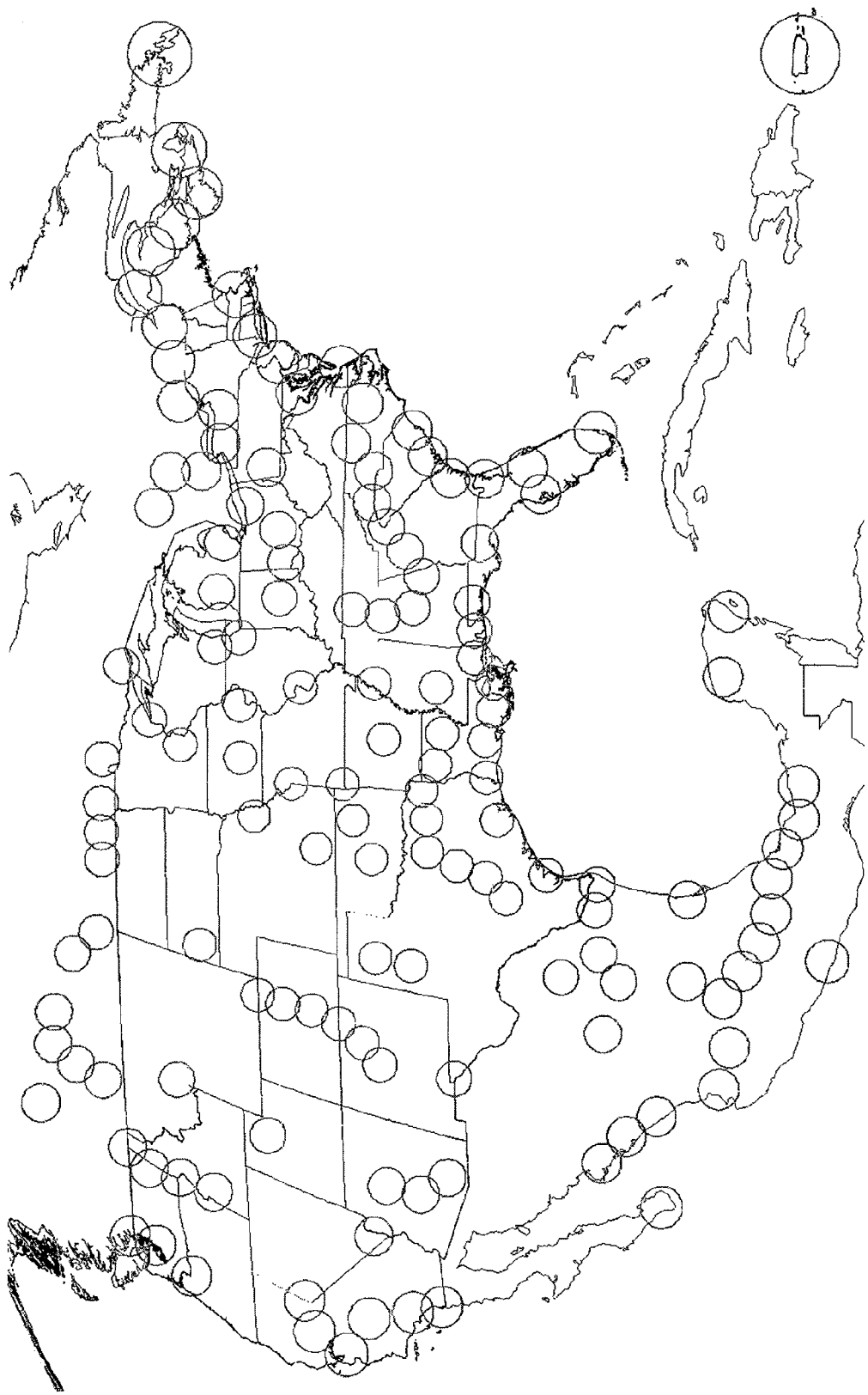
FIGS. 5-7 are simplified maps of portions of North and/or South America that provide examples of spot beam coverage areas in accordance with some embodiments of the present invention.

The system coverage area may be determined by the number of beam feeds and the size of each beam. The number of beam feeds (and thus beams) may be larger than the number of pathways, allowing a large coverage area. An example of placement of many small beams is shown in FIG. 5. Both GW/U beams and user beams are shown. In this example, K=72 pathways are used to provide 144 beams using N=1 user beams plus one GW/U beam per GW. Recall that users within GW/U beams can be provided service, so GW/U beams may also double as user beams. High capacity beams may be placed to cover high subscriber density areas with flexible forward and return capacity provided within those areas.

Figure 6:
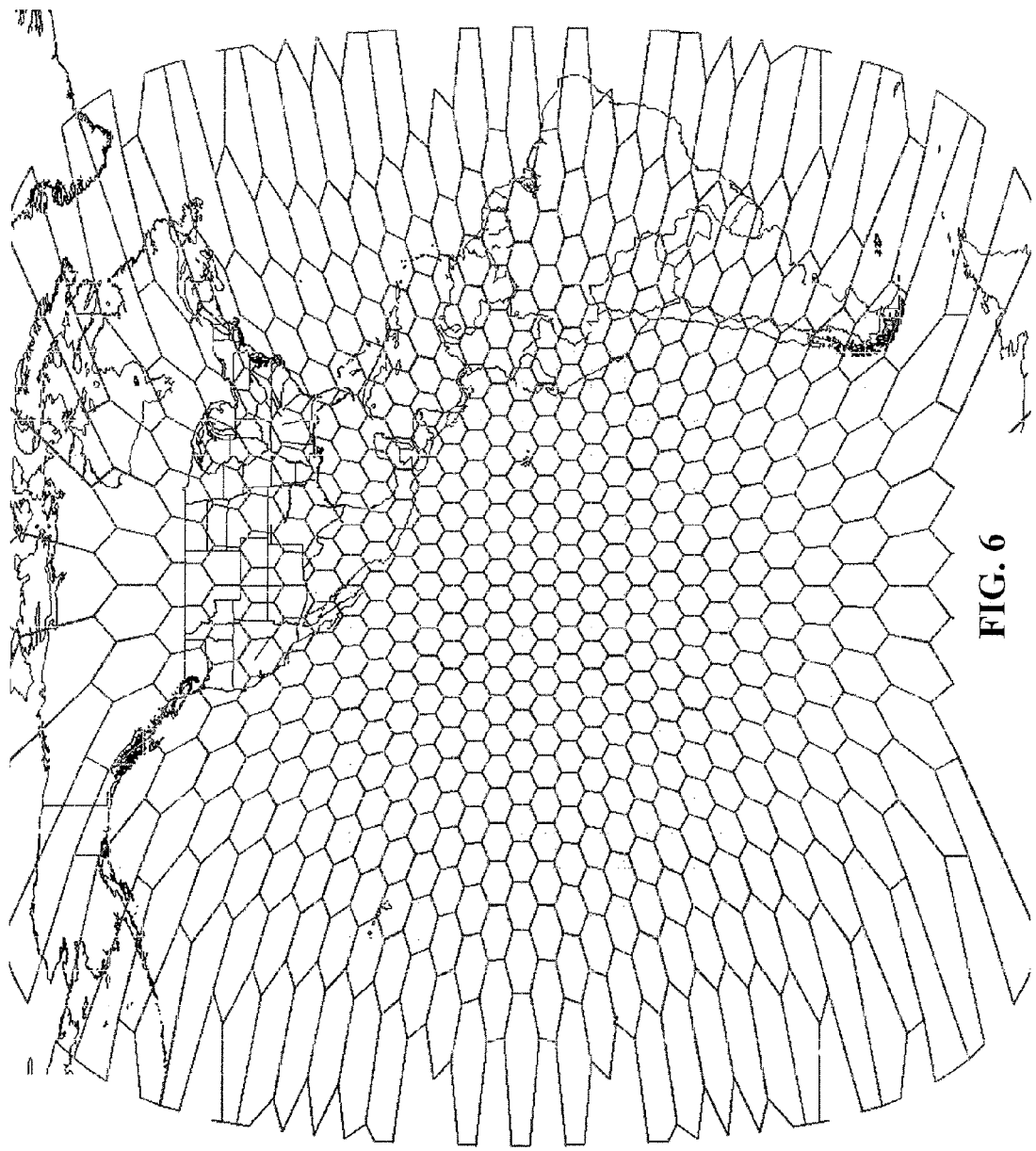

A very large contiguous coverage area may be realized by using a grid of larger beams to blanket the desired coverage area. As shown in the example of FIG. 6, K=72 pathways may be used to generate up to 576 user beams using N=8 user beams per pathway. Not shown are 72 GW/U beams that may also provide service to users in 72 smaller beams. The example shown in FIG. 6 may provide less capacity than the approach used in FIG. 5 because the large beams have less directivity. This can result in a lower transmission rate (bps/Hz).

A hybrid of these approaches may be used to generate large coverage areas and to provide high capacity to dense subscriber areas. As exampled in FIG. 7, K=62 pathways may be used to provide 62 high capacity user beams (≈0.1 degree beam radius–small circles) using N=1 beams per pathway. K=18 pathways may be used to provide 144 large user beams (≈0.6 degree beam radius) using N=8 user beams per pathway. Forty gateway sites (very small circles) are also shown. Each gateway terminal may use two orthogonal polarizations to reduce the required gateway count from 80 to 40. Each gateway site may have a small user beam associated with it adding to the 62 high capacity user beams for a total of 102 high capacity user beams. The coverage areas of individual large and small beams may either partially or fully overlap. Hybrid systems may employ two, three or more different size beams. The ratio of beam radii in such hybrid systems may range from about 1.2:1, 2:1, 3:1, 10:1, etc.

Figure 7:
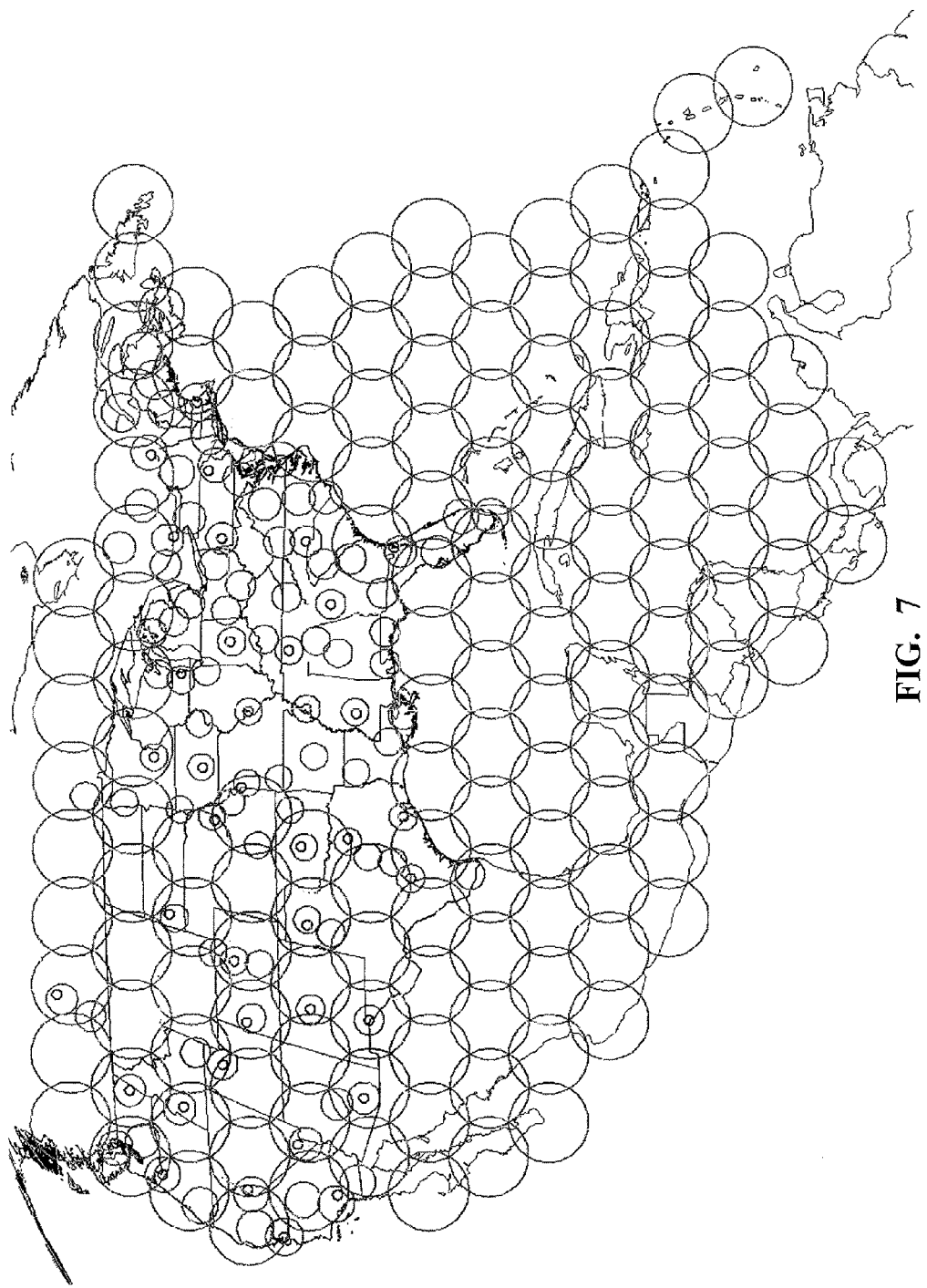

In each of the examples shown in FIGS. 5-7, each beam may reuse the same spectrum allocation. For example, a system allocated 1 GHz of bandwidth in the Ka-band may reuse the same 1 GHz of spectrum in each spot beam.

Interference Management

Beams that are adjacent and/or overlapping (e.g., partially overlapping) may cause substantial interference to each other when the same (or overlapping) frequencies are used in each beam. Two signals using the same frequency may be of different bandwidths and the narrower signal may be partially or totally contained within the bandwidth of the wider signal. Two different polarizations may be used to manage some of the interference by placing the adjacent and/or overlapping beams are on opposite polarizations. In some situations, however, the opportunity for substantial interference may still be present. Substantial interference may either prevent communication from taking place using modulation, coding etc. choices provided by the system or degrade the capacity of the affected beam or beams to an undesired level.

Interference management may reduce interference by scheduling slot usage such that two beams in close proximity (e.g., adjacent or overlapping) and of the same polarization do not transmit or receive at the same time. This management may be aided by the combination of beam grouping and beam scheduling.

A beam group is the group of beams that are associated with a single pathway. FIGS. 2A-2B show that a beam group may consist of 1 GW/U beam and N user beams. Referring to FIG. 1, a satellite may have as many as K beam groups (one for each pathway). Beam grouping is the process of assigning beams (both user and GW/U beams) to each of the beam groups. Beams in the same beam group do not substantially interfere with each other since they share the same pathway and thus cannot transmit or receive at the same time. Interference can be managed by placing beams that are in close proximity to each other and that use the same polarization in the same beam group.

Interference can also be managed using beam scheduling. Beam scheduling is the processes of generating switching patterns for all of the beams in all beam groups. The switching patterns of multiple beams may be coordinated such that nearby (adjacent or overlapping) beams that are not in the same beam group and are not differently polarized from each other will not be assigned to transmit or receive at the same time. This may be possible because beams, except in extreme cases, will not be transmitting 100% of the time or receiving 100% of the time.

For example, consider a satellite with N user beams plus 1 GW/U beam per pathway. Assume that traffic is uniformly distributed in each of these N+1 beams with a 50%-50% split between forward and return channel traffic. If the pathway is time shared N+1 ways (equally) and split 50%-50% for forward and return channel traffic, each user beam will be receiving a fraction of the time equal to 0.5/(N+1) and transmitting a fraction of the time equal to 0.5/(N+1). For N=1, the fraction of time is 0.25. For N=4, the fraction of time is 0.10. Hence, it can be seen that there is an opportunity to schedule nearby user beams at different times.

GW/U beams may be used more frequently than user beams. In the example above, each GW/U beam receives return link traffic (to a gateway site) 50% of the time and receives forward link traffic (to users in the GW/U beam) a fraction equal to 0.5/(N+1) of the time. Thus, the overall receive fraction for the GW/U beam is 0.5*(N+2)/(N+1). For N=1, the fraction of time is 0.75. For N=4, the fraction of time is 0.60. Transmit fractions are the same in this example since forward and return traffic is split 50%-50%.

Scheduling of GW/U beams when forward and return link ratios are not equal can be more challenging since the GW/U beams are either transmitting or receiving a larger fraction of the time. For example, with 100% forward link traffic (e.g., a broadcast satellite), each GW/U beam is transmitting signals (forward link from a gateway site) 100% of the time. No other nearby beams could transmit signals at any time without interfering with the signal from the GW/U. However, since the satellite in this example is forward link only, all user beams will be receiving (no transmitting). Thus, the GW/U beam and user beams will not interfere with each other. Two GW/U beams may, however, interfere with each other. This interference may be avoided by placement of gateway terminals far enough apart from each other such that the frequency can be re-used at each gateway site.

Figure 8:
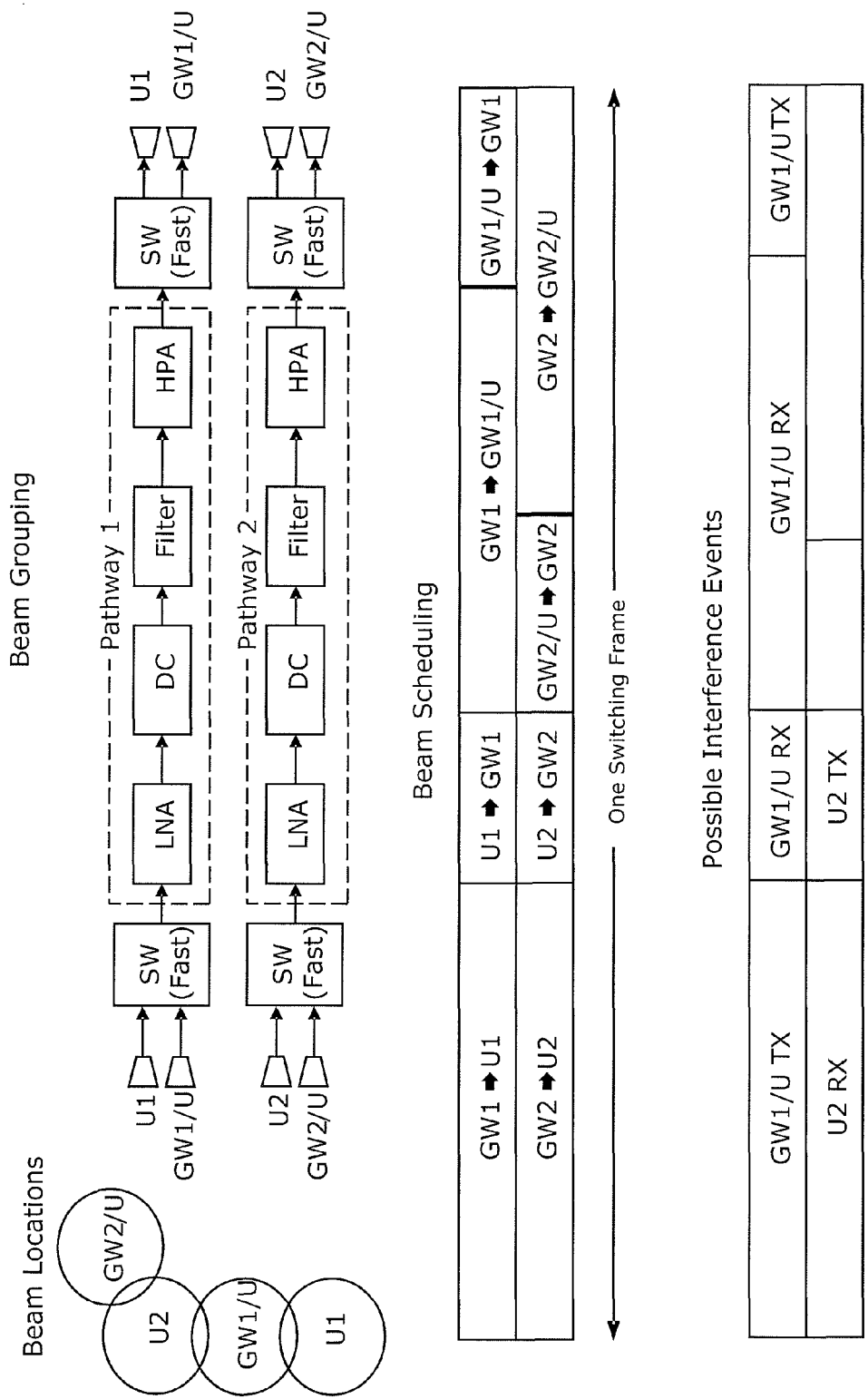
FIG. 8 is a simplified block diagram that illustrates an example of interference management in accordance with an embodiment of the present invention

FIG. 8 illustrates an example of interference management in accordance with some embodiments of the invention. This simple example shows K=2 pathways and N=1 user beam per pathway. Not shown are a beam switch controller that coordinates switching among the two pathways. A desired forward to return traffic ratio of 3:1 is assumed in this example. The beams labeled GW1/U and U1 are in the beam group for pathway 1, and the beams labeled GW2/U and U2 are in the beam group associated with pathway 2. Both pathways may use the same spectrum and the same polarization. Three interference management techniques are employed in this example to mitigate the interference. First, the two gateway locations (and GW/U beams) are located far enough apart to enable simultaneous operation without a substantive level of interference. Second, adjacent beams are placed in the same group to eliminate interference pairs. Thus, GW2/U and U2 are in the one group, while GW1/U and U1 are in another group. These first two techniques by themselves may reduce interference to acceptable levels for the following beam pairs: GW1↔GW2/U, GW1/U↔U1, and GW2/U↔U2. As the beam pairs U1↔U2 and U1↔GW2/U are spaced far enough part to preclude significant interference, the only remaining interfering beam pair is GW1/U↔U2. The third measure, coordinated beam scheduling (implemented by a beam switch controller not shown), may address this interference pair. As can be seen in the example beam schedule illustrated in FIG. 8, neither GW1/U nor U2 are scheduled to transmit at the same time or receive at the same time. During a first time segment, the GW1/U beam is transmitting while the U2 beam is receiving. During the next time segment, the GW1/U beam is receiving while the U2 beam is transmitting. During the remaining time in the frame, U2 is idle (neither transmitting nor receiving) thus avoiding interference for this pair.

Using some embodiments of the beam scheduling techniques disclosed herein, increased flexibility may be provided over prior satellite systems. For example, in prior systems, beam group assignment is a "design time" decision that is typically made before the satellite is constructed, as it can impact the internal plumbing of the satellite. In contrast, beam scheduling, as described in the embodiments disclosed herein, may be a "run time" decision. The designed switching schedules may be altered at any time during the lifetime of the satellite by providing a capability to upload switching patterns to the satellite.

Beam Grouping

By way of example, a satellite may include K beam groups with N user beams and one GW/U beam in each beam group. One gateway terminal may be arbitrarily assigned to each beam group. In choosing the N beams, out of K*N total beams, to be included in a first beam group, there are [KN choose N] possible combinations. In choosing the N beams, out of the remaining (K−1)N beams, to be included in the second beam group, there are [(K−1)N choose N] possible combinations. Continuing this process and multiplying all the combinations together, one can arrive at the total number of possible beam groupings (G) using the following equation:

$$G = \frac{(KN)!}{N!(KN-N)!} \cdot \frac{(KN-N)!}{N!(KN-2N)!} \cdot \frac{(KN-2N)!}{N!(KN-3N)!} \cdots \frac{N!}{N!} = \frac{(KN)!}{(N!)^K} \quad (2)$$

For even a very simple satellite with small values of K and N, the number of possible combinations is very large. For example, K=10 pathways with N=4 beams per pathway results in 1.29E34 possible beam grouping combinations. The selection of beam groupings is therefore a non-trivial. This section describes methods that may be used to generating beam groupings.

First, an objective function can be generated for the beam grouping. The objective function is a way to assign a quantitative value or score to a beam grouping. This will allow one to compare two possible beam groupings and determine which one is more desirable (results in a better score). The objective function may be based upon an objective that is to be accomplished by the beam grouping. There are many possible objectives. Several of these objectives and objective functions are described below.

Objective 1: Balanced Demand.

Here the objective is to balance the total demand for capacity of each of the beam groups. The motivation is the fact that for identical pathways, each pathway would provide about the same amount of capacity. Thus, beam groups with similar total demand would be a good fit for pathways with similar capacity. The objective function is established as follows. Let $d_j^{GW/U}$ be the traffic demand for the GW/U beam (users in the GW/U beam) associated with beam group j. Let $d_{f(i,j)}^u$ be the traffic demand for the $i^{th}$ user beam in the beam group j, where f(i,j) is the beam number of the $i^{th}$ beam, and the geographic location of beam number f(i,j) indicates the demand for that beam. The total demand for that beam group can be given by:

$$D_j = d_j^{GW/U} + \sum_{i=1}^{N} d_{f(i,j)}^u \quad (3)$$

The objective is to keep the total demand in each of the beam groups balanced. An objective function that will provide a quantitative score of how well the beam groupings accomplish this objective is given by:

$$M1 = \text{Max}(D_j) - \text{Min}(D_1) \quad (4)$$

where the maximization and minimization is performed over j and a smaller value of M1 is preferred. A related objective function would be the sample variance of the beam group demand sequence (Dj).

Objective 2: Minimum Interference.

Generally speaking, beams that are closer to each other will cause more interference with each other than beams that are farther from each other. One way to reduce interference is to place beams that are close to each other in the same beam group as they cannot interfere with each other. This leads to an objective of a small separation between all beams in a beam group. Let $\theta_j^{GW/U}(i)$ be the angular separation, as seen from the satellite, between the center of the GW/U beam in beam group j and the center of the $i^{th}$ user beam in beam group j, which is identified by beam number f(i,j). Let $\theta_j^u(i1, i2)$ be the angular separation between beam centers of beams i1 and i2 in beam group j. These beams are identified by beam numbers f(i1,j) and f(i2, j). The average separation between all beams in beam group j may be calculated by:

$$\theta_j^{Avg} = \frac{\sum_{i=1}^{N} \theta_j^{GW/U}(i) + \sum_{i1=1}^{N} \sum_{i2=i1+1}^{N} \theta_j^u(i1, i2)}{N(N+1)/2} \quad (5)$$

One possible objective function may be the average of all the beam group average beam separations. Another may be the maximum of the beam group average beam separations. These objectives functions are expressed as:

$$M2 = \frac{1}{K} \sum_{j=1}^{K} \theta_j^{Avg} \text{ or } M2 = \text{Max}(\theta_j^{Avg}) \quad (6)$$

The former represents a measure of an average beam separation across all beam groups and the later represents a measure of an average beam separation in a worst case beam group. In both cases, a lower value is a better score.

Objective 3: Busy Hour Load Shifting:

For traffic models that have a strong temporal variation, improved system performance may be obtained if the "busy hour" occurs at different times for beams that are in the same beam group. This allows one to shift capacity between beams in the beam group depending on which beam is seeing the busy hour. This technique is most effective when the busy hour of two beams does not occur at the same time. The idea is to put beams in the same beam group in different time zones and to have as much time separation as possible between the time zones. Since time zones are highly correlated to the longitude of the geographic location of the beam, one objective is to keep beams in a beam group separated as much as possible in longitude. Similar to objective 2 above, define $\lambda_j^{GW/U}(i)$ to be the absolute value of the difference in longitude of the center of the GW/U beam in beam group j and the center of the $i^{th}$ user beam in beam group j, which is identified by beam number f(i,j). Let $\lambda_j^u(i1, i2)$ be an absolute value of the difference in longitude of the beam centers of beams i1 and i2 in beam group j. These beams are identified by beam numbers f(i1,j) and f(i2, j). An average longitude separation between all beams in beam group j may be calculated by:

$$\lambda_j^{Avg} = \frac{\sum_{i=1}^{N} \lambda_j^{GW/U}(i) + \sum_{i1=1}^{N} \sum_{i2=i1+1}^{N} \lambda_j^u(i1, i2)}{N(N+1)/2} \quad (7)$$

Possible objective functions are the average of all the beam group average longitude separations and the minimum of the beam group average longitude separation. These objective functions may be expressed as:

$$M3 = \frac{1}{K} \sum_{j=1}^{K} \lambda_j^{Avg} \text{ or } M3 = \text{Min}(\lambda_j^{Avg}) \quad (8)$$

The former may represent a measure of the average longitude separation across all beam groups and the later may represent a measure of the average longitude separation in the worst case beam group. In both cases a higher value is a better score.

Objective 4: Number of Scheduling Conflicts:

Here an objective is to minimize the number of beam conflicts that must be de-conflicted by the design of switching patterns. Let the function $q^u(i1,j1,i2,j2)$ assume a value of 1 if beam i1 in beam group j1 cannot be transmitting/receiving at the same time that beam i2 in beam group j2 is transmitting/receiving due to unacceptable interference levels. If it is acceptable for the two beams to be transmitting/receiving at the same time, then the function assumes a value of 0. Similarly, let the function $q^{GW/U}(j1,i2,j2)$ assume a value of 1 if the GW/U beam in beam group j1 cannot be transmitting/receiving at the same time as beam i2 in beam group j2 due to significant interference, and a value of 0 otherwise. The number of conflicts between beams in beam groups j1 and j2 may be represented as:

$$Q_{j1,j2} = \qquad (9)$$
$$\sum_{i2=1}^{N} q^{GW}(j1, j2, i2) + \sum_{i1=1}^{N} q^{GW}(j2, j2, i1) + \sum_{i1=1}^{N} \sum_{i2=1}^{N} q^u(i1, j1, i2, j2)$$

An objective function may be the sum of all the conflicts between all pairs of beam groups:

$$Q = \sum_{j1=1}^{K} \sum_{j2=j1+1}^{K} Q_{j1,j2} \quad (10)$$

and a lower value is a better score.

Objective 5: Soft Interference:

A measure of the total interference can be generated in a fashion similar to Objective 4 above. Let the function $s^u(i1, j1, i2, j2)$ be the interference level between beam i1 in beam group j1 and beam i2 in beam group j2. The interference level can be normalized to the carrier level, so that the function su (i1,j1,i2,j2) is the interference to signal level (I/C) between the two beams. Denoting the i1,j1 beam as beam A and the i2,j2 beam as beam B, at least four different interference scenarios may be considered:

1. UL: A on B. This is the UL interference (I/C) for uplink signals in beam A interfering with uplinks in beam B.
2. UL: B on A. This is the UL interference (I/C) for uplink signals in beam B interfering with uplinks in beam A.
3. DL: A on B. This is the DL interference (I/C) for downlink signals to beam A interfering with downlinks to beam B.
4. DL: B on A. This is the DL interference (I/C) for downlink signals to beam B interfering with downlink to beam A.

It is not uncommon for beam pairs to have a different value for I/C on the uplink as the downlink. Also, especially when the beams are of different sizes, the interference for A on B may be quite different from B on A. All of the four scenarios above can be characterized with an I/C value. The maximum I/C value of the four scenarios can be used for the function $s^u(i1,j1,i2,j2)$.

Similarly, let the function $S^{GW/U}(i1,i2,j2)$ be the level of interference (I/C) between the GW/U beam in beam group j1 and user beam i2 in beam group j2. The function should yield the maximum I/C value of the 4 scenarios between the two beams. Then the total interference between beams in beam groups j1 and j2 may be given by:

$$s_{j1,j2} = \sum_{i2=1}^{N} s^{GW/U}(j1, j2, i2) + \qquad (11)$$

$$\sum_{i1=1}^{N} s^{GW/U}(j2, j1, i1) + \sum_{i1=1}^{N} \sum_{i2=1}^{N} s^{u}(i1, j1, i2, j2)$$

The objective function may be the sum of the interference between all pairs of beam groups:

$$S = \sum_{j1=1}^{K} \sum_{j2=j1+1}^{K} S_{j1,j2} \qquad (12)$$

and a lower value is a better score.

In addition to objectives, some rules (or constraints) may be established to define the beam groupings. For example, a first constraint may be: one and only one GW/U beam is assigned per beam group. Another constraint may be: each user beam may be assigned to only one beam group. In some designs, these may be the only constraints. In other designs, additional constraints can be introduced to accomplish certain objectives. Some examples are:

For single feed per beam (SFPB) antenna architectures that use multiple reflectors, each with their own feed array, it may be desirable to have the feeds for all beams in a beam group located on the same feed array (illuminated by the same reflector). This may allow for simpler waveguide routing within the satellite. This objective may be accomplished by creating a constraint that says all beams in a beam group need to be on the same reflector.

In some applications, it is desirable to keep beams in a geographic region or country in the same beam group or groups. This may be accomplished by defining a constraint that all beams in a beam group must be from the same geographic region or country.

Once the objective function is selected and the beam grouping constraints (rules) have been established, the following iterative steps can be used to find preferred beam groupings:

1. Find an initial beam group assignment that is valid. That is, it does not violate any rules. This initial grouping can be obtained without regard to the value of the objective function. Random assignment of beams to beam groups with validity checks will work fine. This initial beam group assignment is the current beam group assignment.
2. Using the initial beam assignment, compute the objective function score. This is the current score.
3. Pick a user beam either at random or sequentially from an ordered list. This selected beam will be moved in attempt to improve the objective function score.
4. Swap the selected beam from (3), with a beam in another beam group.
5. Check the new beam group assignment against the rules. If it is a valid assignment, calculate the new objective function score. Store the score and the beam group assignment and then re-store the swapped beams to the current beam group assignment.
6. Repeat step (4) and (5) for every beam in every beam group except the beam group of the selected beam.
7. Choose the best objective score obtained in (5). If this score is better than the current score, replace the current score with this best score. Then, modify the current beam group assignment by using the beam swap that produced the best score. If the best score is not better than the current score, then no change is made to either the current score or the current beam group assignment.
8. Repeat steps (3)-(7) until the score doesn't improve for a large number of trials ($N_{stop}$).

Eventually, one will find that the score can no longer be significantly improved even after a large number of attempts. At this point the algorithm has reached a local optimum, which may or may not be a global optimum. An attempt to find a better local optimum can be performed by randomly re-assigning a significant fraction (a), which may be $\geq 0.25$ and $\leq 1.0$, of the beam assignments without regard to score but maintaining validity of the beam group assignment. A simple way to do this is to pick a beam at random and swap it with another random beam from a different randomly-selected beam group. However, the beams to be swapped must be selected to maintain the validity of the beam group assignment. This random beam swap process may be repeated until the desired fraction of beam assignments has been changed. This may be sued as a new current beam group assignment and steps (2)-(8) executed to see if the resulting local optimum is better than the previous one.

This random re-initialization of the beam group assignments followed by execution of steps (2)-(8) can be performed a large number of times in search for the best local optimum. The execution speed and performance of the algorithm is controlled by the parameters $N_{stop}$ and $\alpha$. One can experiment with the parameters to determine the best performance with the selected objective function and satellite configuration (number of beams, pathways, and beam groups).

Embodiments of the present invention are not limited to the examples shown or described herein. For example, embodiments of the present invention may be used with any number of pathways, and receive-side switches and transmit-side switches may be associated with any suitable number of beam feeds, forming beam groups of various sizes. Different pathways on a satellite may be coupled to receive-side switches and transmit-side switches that are associated with the same or a different numbers of beam feeds.

In some embodiments of the invention, a satellite providing interference management capability is provided. The satellite may include a plurality of pathways. The pathways may be as in any of the examples described above. Each pathway may be coupled to a means for beam switching among a beam group comprising a plurality of beams associated with the means for beam switching. For example, the means for beam switching can be: a transmit switch, a receive switch, or any combination of a transmit switch and receive switch as described above. The means for beam switching may switch among the plurality of beams according to a switching pattern.

The satellite may further include a means for coordinating the switching of multiple pathways to each other. For example, the means for coordinating may allow forward/return traffic transmitted to/from a first spot beam coverage area on a same frequency as forward/return traffic transmitted to/from a second spot beam coverage area to avoid substantial interference. For example, the means for coordinating can be a single controller controlling receive and/or transmit switches of multiple pathways, or multiple single pathway controllers sharing a common coordination signal such as a clock. A switching pattern may be stored in memory at a controller. The switching pattern may be uploaded to the controller using an uplink signal that may be in-band (e.g., using particular time slots or carriers within the communications system) or out-of-band (e.g., using a separate command control and telemetry link to the satellite). Multiple patterns may be stored on the satellite and placed into operation quickly, either by an uplink control signal or under satellite local control.

Furthermore, features of one or more embodiments may be combined with features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for conducting communications via a satellite comprising:
   using an antenna subsystem of the satellite to provide a plurality of fixed location spot beams in a hub-spoke spot beam satellite communication system, the spot beams being assigned to beam groups according to an objective;
   wherein a first beam group comprises: (a) one of the spot beams illuminating a first gateway terminal, and (b) one of the spot beams illuminating a first user terminal;
   wherein a second beam group comprises: (a) one of the spot beams illuminating a second gateway terminal, and (b) one of the spot beams illuminating a second user terminal;
   wherein the satellite comprises a first pathway associated with the first beam group and a second pathway associated with the second beam group;
   sequentially switching at least one transmit-side switch associated with the first pathway to connect an output of the first pathway with different spot beams within the first beam group to establish traffic between a gateway and at least one user terminal, according to a first transmit beam switching pattern;
   sequentially switching at least one transmit-side switch associated with the second pathway to connect an output of the second pathway with different spot beams within the second beam group to establish traffic between a gateway and at least one user terminal, according to a second transmit beam switching pattern;
   coordinating the first transmit beam switching pattern and the second transmit beam switching pattern to avoid substantial interference between traffic transmitted to a spot beam of the first beam group on a same frequency as traffic transmitted to a spot beam of the second beam group.

2. The method of claim 1, wherein the coordinating comprises avoiding substantial interference between traffic transmission to the first user terminal and traffic transmission to the second user terminal.

3. The method of claim 1, wherein the coordinating comprises avoiding substantial interference between traffic transmission to the first gateway terminal and traffic transmission to the second gateway terminal.

4. The method of claim 1, wherein the coordinating comprises avoiding substantial interference between traffic transmission to the first user terminal and traffic transmission to the second gateway terminal.

5. The method of claim 1, further comprising:
   sequentially switching at least one receive-side switch associated with the first pathway to connect an input of the first pathway with different spot beams within the first beam group according to a first receive beam switching pattern;
   sequentially switching at least one receive-side switch associated with the second pathway to connect an input of the second pathway with different spot beams within the second beam group according to a second receive beam switching pattern;
   coordinating the first receive beam switching pattern and the second receive beam switching pattern to avoid substantial interference between traffic reception from a spot beam of the first beam group on a same frequency as traffic reception from a spot beam of the second beam group.

6. The method of claim 5, wherein coordinating the first receive beam switching pattern and the second receive beam switching pattern comprises avoiding substantial interference between traffic reception from the first user terminal and traffic reception from the second user terminal.

7. The method of claim 5, wherein coordinating the first receive beam switching pattern and the second receive beam switching pattern comprises avoiding substantial interference between traffic reception from the first gateway terminal and traffic reception from the second gateway terminal.

8. The method of claim 5, wherein coordinating the first receive beam switching pattern and the second receive beam switching pattern comprises avoiding substantial interference between traffic transmission from the first user terminal and traffic reception from the second gateway terminal.

9. The method of claim 1, wherein at least two of the spot beams have significantly different radii.

10. The method of claim 1, wherein the objective is to balance demand among beam groups.

11. The method of claim 1, wherein the objective is to minimize interference by minimizing angular separation of beams in a beam group.

12. The method of claim 1, wherein the objective is to place beams with different busy hours into the same beam group.

13. The method of claim 1, wherein the objective is to minimize a number of beam conflicts that must be de-conflicted between beams in different beam groups.

14. The method of claim 1, wherein the objective is to minimize soft interference by minimizing the sum of the interference between all pairs of beam groups.

15. The method of claim 1, wherein the spot beams are assigned to beam groups by updating an assignment using an iterative process wherein at an iterative step, (a) a variation is introduced in the assignment, (b) the objective is evaluated to determine if an improvement is made, and (c) if an improvement is made, the variation is accepted.

16. The method of claim 15, wherein the iterative steps result in reaching a local optimum and upon reaching the local optimum, a random variation is introduced in the assignment, and further iterative steps are taken to improve the objective.

17. The method of claim 1, wherein the antenna subsystem uses a single feed per beam (SFPB) architecture with multiple reflectors each having its own feed array, and feeds for the spot beams in the first beam group are located on a first feed array and feeds for the spot beams in the second beam group are located on a second feed array different from the first feed array.

18. The method of claim 1, wherein the spot beams in the first beam group illuminate portions of a first geographic region and the spot beams in the second beam group illuminate portions of a second geographic region different from the first geographic region.

19. A satellite communication system comprising:
a plurality of gateway terminals;
a plurality of user terminals;
a satellite in communication with the plurality of gateway terminals and the plurality of user terminals in a hub-spoke arrangement;
wherein the satellite comprises:
   a directional antenna subsystem arranged to form a plurality of fixed location spot beams, wherein the spot beams are assigned to beam groups according to an objective;
   a plurality of pathways coupled to the directional antenna subsystem, wherein each pathway is associated with a beam group, and wherein each beam group comprises: (a) a spot beam illuminating a gateway spot beam coverage area containing a gateway terminal, and (b) a spot beam illuminating a user spot beam coverage area containing a user terminal;
   a first transmit-side switch coupled to an output of a first pathway and configured to perform sequential switching to connect the output of the first pathway with different spot beams within a first beam group to establish traffic between a first gateway terminal and a first user terminal, according to a first transmit beam switching pattern;
   a second transmit-side switch coupled to an output of a second pathway and configured to perform sequential switching to connect the output of the second pathway with different spot beams within a second beam group to establish traffic between a second gateway terminal and a second user terminal, according to a second transmit beam switching pattern; and
   a beam switch controller coupled to the first transmit-side switch and the second transmit-side switch and configured to coordinate the first transmit beam switching pattern and the second transmit beam switching pattern to avoid substantial interference between traffic transmitted to a spot beam of the first beam group on a same frequency as traffic transmitted to a spot beam of the second beam group.

20. The satellite communication system of claim 19, the satellite further comprising:
   a first receive-side switch coupled to an input of the first pathway and configured to perform sequential switching to connect the input of the first pathway with different spot beams within the first beam group according to a first receive beam switching pattern;
   a second receive-side switch coupled to an input of the second pathway configured to perform sequential switching to connect the input of the second pathway with different spot beams within the second beam group according to a second receive beam switching pattern; and
   wherein the beam switch controller is coupled to the first receive-side switch and the second receive-side switch and further configured to coordinate the first receive beam switching pattern and the second receive beam switching pattern to avoid interference between traffic received from a spot beam of the first beam group on a same frequency as traffic received from a spot beam of the second beam group.

21. A communication satellite comprising:
   a directional antenna subsystem arranged to form a plurality of fixed location spot beams, wherein the spot beams are assigned to beam groups according to an objective;
   a plurality of pathways coupled to the directional antenna subsystem, wherein each pathway is associated with a beam group;
   a first transmit-side switch coupled to an output of a first pathway and configured to perform sequential switching to connect the output of the first pathway with different spot beams within a first beam group to establish traffic according to a first transmit beam switching pattern;
   a second transmit-side switch coupled to an output of a second pathway and configured to perform sequential switching to connect the output of the second pathway with different spot beams within a second beam group to establish traffic according to a second transmit beam switching pattern; and
   a beam switch controller coupled to the first transmit-side switch and the second transmit-side switch and configured to coordinate the first transmit beam switching pattern and the second transmit beam switching pattern to avoid substantial interference between traffic transmitted to a spot beam of the first beam group on a same frequency as traffic transmitted to a spot beam of the second beam group.

22. The satellite of claim 21, further comprising:
   a first receive-side switch coupled to an input of the first pathway configured to perform sequential switching to connect the input of the first pathway with different spot beams within the first beam group according to a first receive beam switching pattern;
   a second receive-side switch coupled to an input of the second pathway configured to perform sequential switching to connect the input of the second pathway with different spot beams within the second beam group according to a second receive beam switching pattern; and
   wherein the beam switch controller is coupled to the first receive-side switch and the second receive-side switch and further configured to coordinate the first receive beam switching pattern and the second receive beam switching pattern to avoid substantial interference between traffic received from a spot beam of the first beam group on a same frequency as traffic received from a spot beam of the second beam group.

23. The satellite of claim 21, wherein at least two of the spot beams have significantly different radii.

24. The satellite of claim 21, wherein the objective is to balance demand among beam groups.

25. The satellite of claim 21, wherein the objective is to minimize interference by minimizing angular separation of beams in a beam group.

26. The satellite of claim 21, wherein the objective is to place beams with different busy hours into the same beam group.

27. The satellite of claim 21, wherein the objective is to minimize a number of beam conflicts that must be de-conflicted between beams in different beam groups.

28. The satellite of claim 21, wherein the objective is to minimize soft interference by minimizing the sum of the interference between all pairs of beam groups.

* * * * *